United States Patent
Woodbridge et al.

[11] Patent Number: 5,512,253
[45] Date of Patent: Apr. 30, 1996

[54] IRRADIATOR APPARATUS

[76] Inventors: Thomas C. Woodbridge, 746 S. Orlando Ave., Apt. 602, Cocoa Beach, Fla. 32931; John C. Fenoli, 11207-116th Pl., N.E., Kirkland, Wash. 98033

[21] Appl. No.: 313,415

[22] Filed: Sep. 27, 1994

Related U.S. Application Data

[63] Continuation of Ser. No. 787,040, Nov. 4, 1991, abandoned.

[51] Int. Cl.⁶ .................................................. B01J 19/08
[52] U.S. Cl. ............... 422/186; 422/186.04; 422/186.07; 422/906
[58] Field of Search ...................... 422/186, 186.07, 422/186.08, 186.12, 186.18, 186.04, 906; 204/157.15, 176; 210/748, 760

[56] References Cited

U.S. PATENT DOCUMENTS

| | | | |
|---|---|---|---|
| 3,865,734 | 2/1975 | Woodbridge | 250/432 |
| 4,141,830 | 2/1979 | Last | 210/632 |
| 4,156,652 | 5/1979 | Wiest | 250/527 |
| 4,179,616 | 12/1979 | Coviello et al. | 250/527 |
| 4,189,363 | 2/1980 | Beitzel | 204/157.1 R |
| 4,233,126 | 11/1980 | Garcia | 204/157.1 H |
| 4,453,079 | 6/1984 | Woodbridge | 250/432 X |
| 4,563,286 | 1/1986 | Johnson et al. | 210/721 |
| 4,694,179 | 9/1987 | Lew et al. | 250/431 |
| 4,857,204 | 8/1989 | Joklik | 210/695 |
| 5,266,215 | 11/1993 | Engelhard | 210/748 |
| 5,352,359 | 10/1994 | Nagai et al. | 210/192 |

Primary Examiner—Donald P. Walsh
Assistant Examiner—Daniel Jenkins
Attorney, Agent, or Firm—William M. Hobby, III

[57] ABSTRACT

An irradiator apparatus has a plurality of gamma radiation sources mounted in a housing and includes an ozone generator located in the housing and using the irradiator gamma radiation sources to generate the ozone. A plurality of gamma radiation sources are mounted in the irradiator housing with a gas passageway formed around each source for irradiating air or oxygen passing therearound from a gas input through the housing. A fluid passageway is located inside the irradiator housing and adjacent the plurality of gamma radiation sources for irradiating a liquid passing therethrough. The fluid passageway is connected between a liquid input opening and a liquid output opening through the irradiator housing. The gas passageways connect the ozone generator tubes to the fluid passageway for feeding ozone into the liquid being irradiated so that the irradiator generates ozone and feeds the ozone into the fluid being irradiated. The irradiator gamma radiation sources are used for generating the ozone in the ozone generator as well as irradiating the fluid passing through the irradiator.

15 Claims, 2 Drawing Sheets

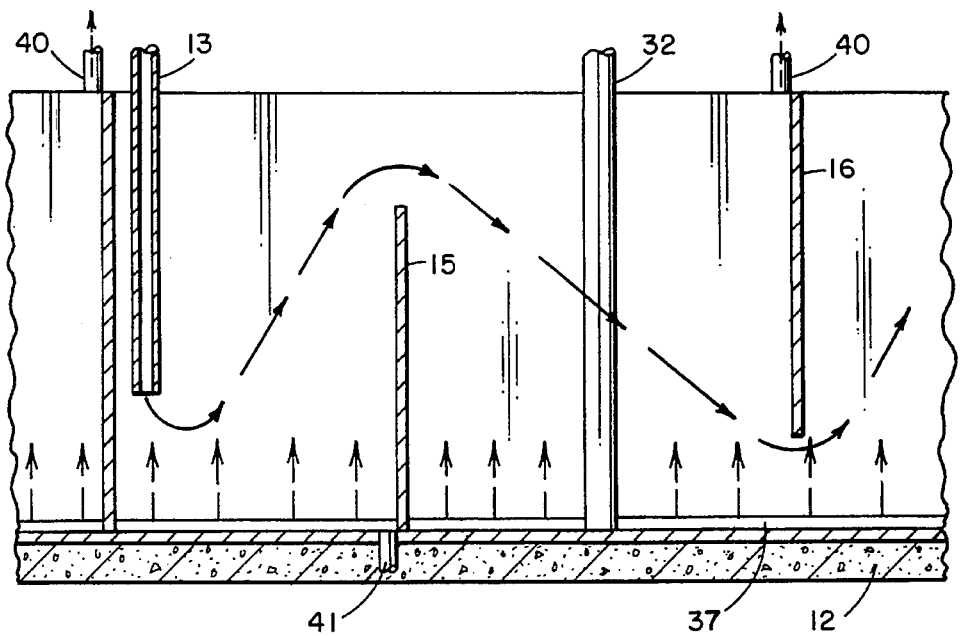
FIG. 3
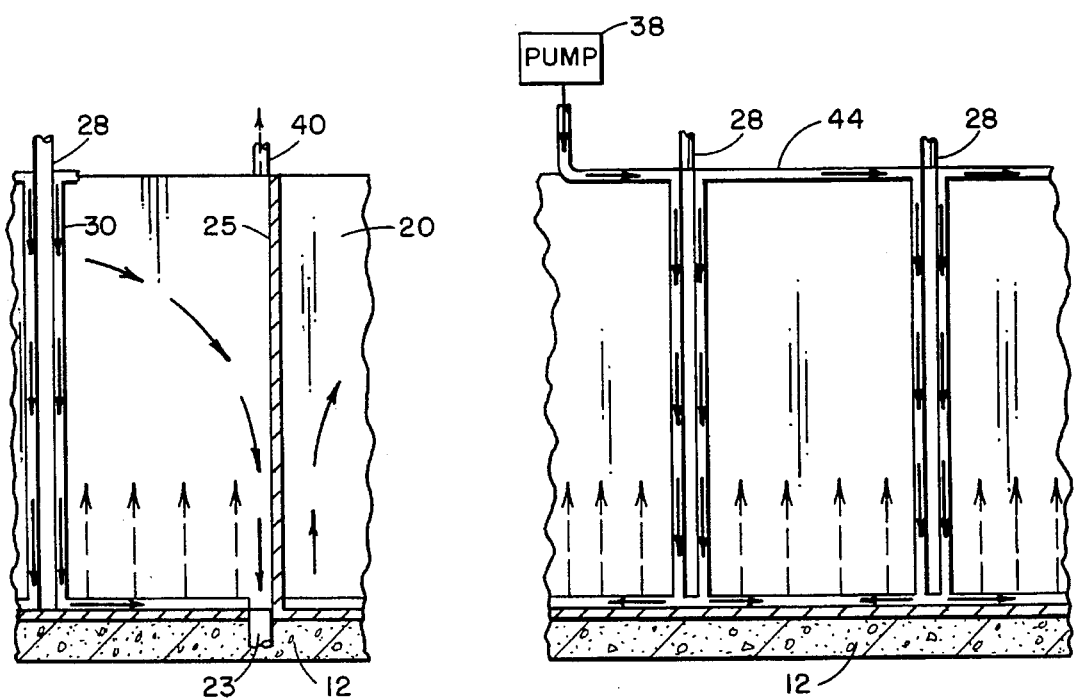
FIG. 4
FIG. 5
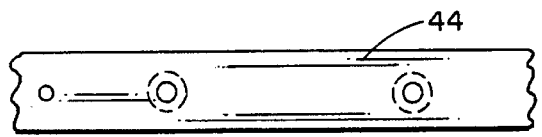
FIG. 6

IRRADIATOR APPARATUS

This application is a continuation of application Ser. No. 07/787,040, filed Nov. 4, 1991, now abandoned.

BACKGROUND OF THE INVENTION

The present invention relates to a irradiator apparatus and especially to an irradiator apparatus and method for generating ozone within the irradiator which is fed into a fluid being treated in the irradiator.

The importance of chemical and biological contamination of fluids has become a significant factor in the handling and disposal of waste fluids. Chemicals that occur in water following conventional treatment are known to be dangerous to human health. New methods are needed to destroy the chemical structures of toxic materials that occur in water and other fluids. The present method uses a combination of ozone ($O_3$), oxygen ($O_2$) and gamma ray ($\gamma$) irradiation to destroy the molecular structure of both chemical and biological toxic materials in fluids.

Previous irradiation patents have been primarily directed at destroying biological organisms within fluids. The present concept utilizes the combination of ozone ($O_3$), oxygen ($O_2$), and gamma rays ($\gamma$) to break up the molecular structure of toxic chemicals and simultaneously destroy biological organisms.

Decomposition of water and other fluids by gamma rays has been known to exist for many years. However, many of the observed results were difficult to explain until the hydrated electron was postulated in the early 1950's. Gamma rays ($\gamma$) from both cobalt-60 and cesium-137 have energies so great that they both ionize and excite many liquid molecules along their path, as shown in the following equations:

$$H_2O + \gamma \rightarrow H_2O^+ + e^-_s$$

$$H_2O + \gamma \rightarrow H_2O^*$$

The electron removed from the water molecule has energy of a magnitude such that it also ionizes and excites other fluid molecules. As the electron loses energy, it become subexcitable, then thermal, and finally hydrolyzes.

The positive water or other fluid ions also react with other water or fluid molecules. In water, a hydroxyl free radical is formed as shown in the following equation:

$$H_2O^+ + H_2O \rightarrow H_3O + OH^o$$

During this same period of time, the excited water molecules decompose into hydrogen free radicals and hydroxyl free radicals as shown in the following equation:

$$H_2O^* \rightarrow H^o + OH^o$$

The three reactive species $e^-_{eg}$, $H^o$ and $OH^o$ are produced by the irradiation of water and other fluids and result in the decontamination of the fluid. Secondary effects within the fluids also result in the production of hydrogen peroxide, free hydrogen, peroxyle free radicals, and other ions. These secondary species increase the effectiveness of the irradiation to decompose toxic chemicals and biological materials.

Addition of oxygen or a halogen, such as chlorine, to a fluid during irradiation greatly increases the production of hydrated electrons and other reactive ionic species. Positive synergistic effects have been experimentally found to exist when specific materials were added to a fluid just prior to or during irradiation.

In addition to the primary effect of the gamma rays on chemical contaminants and the secondary effects of the hydrated electrons and reactive ions, the gamma rays produce ultraviolet radiation throughout a large volume surrounding the cobalt-60 or cesium-137. When cobalt 60 or cesium-137 is placed in an aqueous environment, Cherenkov radiation is observed. This radiation is produced by electrons that have been knocked off the water molecules and possess a velocity greater than the velocity of light in the aqueous solution. The electrons produce a "bow-wave" of light or radiation that is primarily of the ultraviolet frequency. This "bow-wave" is similar to the "shock-wave" of a super sonic jet plane.

Because of the difference in the particle velocity and the phase velocity of light in the medium, there is no longer complete destructive interference and the electron radiates. This radiation is mostly in the ultraviolet part of the spectrum. However, when one sees Cherenkov radiation, they see only the blue tail of the radiated spectrum. The ultraviolet radiation is thus produced within the medium itself and the problem of minimal depth of penetration from an exterior UV source is eliminated. All of the detoxification and disinfection properties of ultraviolet radiation is obtained throughout the volume of the irradiator.

The present method and apparatus incorporates the combined effects of irradiation and ozonation to destroy both chemical and biological toxic materials. This method also uses the synergistic effects of ozone, oxygen, nitrogen, or air to increase the effectiveness of the irradiation process.

Prior irradiators may be seen in prior U.S. patents including U.S. Pat. No. 3,865,734 for an Irradiator Apparatus which utilizes an irradiator having an irradiation source therein along with means to feed various gases into the irradiator. The gases suggested in this patent are chlorine, ozone and oxygen. In U.S. Pat. No. 4,453,079, improvements include the separation of the irradiator into a series of chambers to take advantage of the fact that irradiation is more effective in a series of irradiation treatments of the fluid. This is useful because radiation sources having a lower level of radiation, such as spent fuel from nuclear plants, can be effectively utilized in the irradiator. This allows the use of what would otherwise be waste nuclear energy from a potential waste product.

The present invention improves on prior art irradiators by using a combination with ozone or oxygen by incorporating an ozone generator into the irradiator housing and using the gamma radiation from the irradiator sources to create the ozone from an air or oxygen pump into the generator and then feeding the ozone rich gas directly into the liquid being treated by the same radiation sources while the liquid is passing through a passageway. Thus, the irradiator is able to act both as the ozone generator and as a fluid treatment irradiator, both using the same radiation source which maybe cobalt-60 or cesium-137 to its own generator and also ionizes other gases being fed through the gamma radiation field therein either while creating the ozone or in a separate operation. The ozone thus created serves as a synergistic agent that greatly increases sterilization and the breakdown of the molecular structure of toxic chemicals.

SUMMARY OF THE INVENTION

An irradiator apparatus of the type using gamma radiation is formed in an irradiator housing and has an ozone generator located in the irradiator housing and having a gas passageway through the ozone generator. A plurality of gamma radiation sources are mounted adjacent to the ozone generator gas passageway for irradiating air or oxygen passing therethrough from a gas input through the housing. A fluid passageway is located inside the irradiator housing and adjacent a plurality of gamma radiation sources for irradiating a liquid passing therethrough. The fluid passageway is connected between a liquid input opening and a liquid output opening through the irradiator housing. A gas passageway connects the ozone generator to the fluid passageway for feeding ozone into the liquid being irradiated so the irradiator generates ozone and feeds the ozone into the fluid being irradiated while using the irradiator gamma radiation sources for generating the ozone in the ozone generator. The ozone generator is mounted around each radiation source and has the fluid passageway passing therearound with the irradiation sources spaced for simultaneously irradiating the gas to form ozone and the liquid passing therearound.

A method for the treatment of fluid in an irradiator is also provided which includes the step of feeding a gas, such as air or oxygen, into an irradiator through a gas passageway in the irradiator, irradiating the gas being fed thereinto to form ozone or an ionized gas. Simultaneously, a liquid is fed into the irradiator through a liquid passageway to an opening in the irradiator housing and the irradiated gas from the gas passageway is fed into the liquid passing through the irradiator while the liquid is being irradiated by a gamma radiation source. The irradiated liquid, which has also been treated with ozone generated in the irradiator, is then fed from the irradiator. The ozone may be forced under pressure into the fluid passageway from the bottom so that it bubbles through the fluid and may have a separate exit for discharging the gas having passed through the liquid.

BRIEF DESCRIPTION OF THE DRAWINGS

Other objects, features, and advantages of the present invention will be apparent from the written description and the drawings in which:

FIG. 3 is a sectional view taken on the line 3—3 of FIG. 1;

FIG. 4 is a sectional view taken on the line 4—4 of FIG. 1;

FIG. 5 is a sectional view taken on the line 5—5 of FIG. 1; and

FIG. 6 is a partial top elevation of the gas feed manifold.

DESCRIPTION OF THE PREFERRED EMBODIMENT

Figures 1, 2:
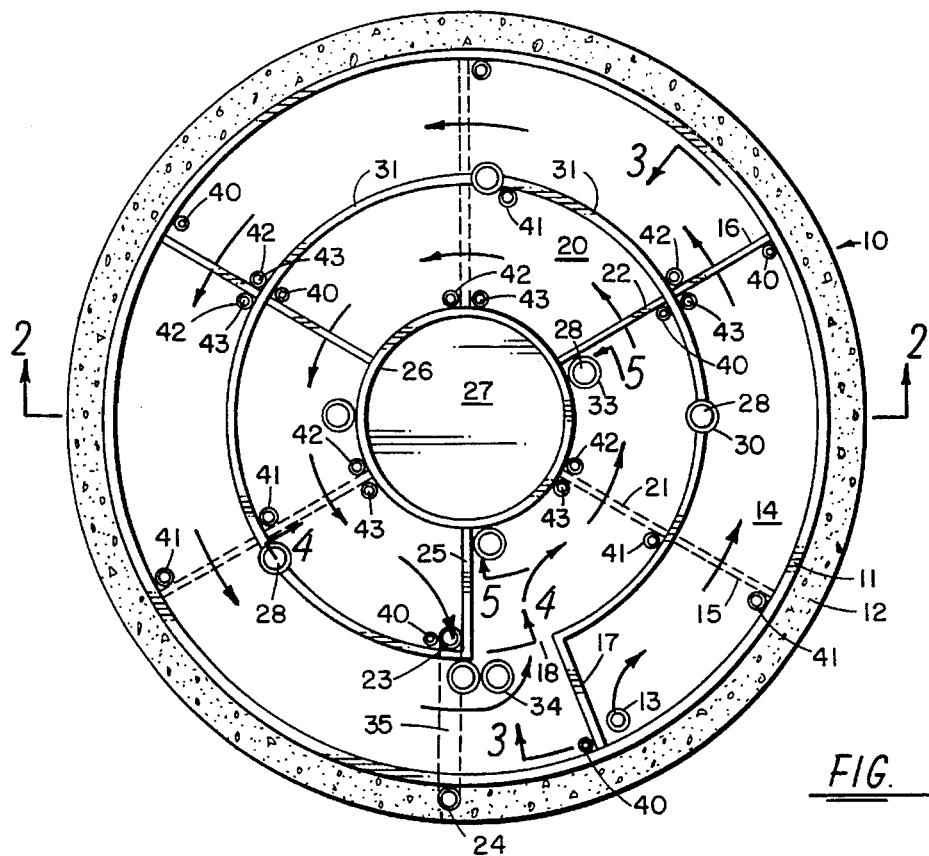
FIG. 1 is a sectional view taken through the top of an irradiator in accordance with the present invention.
FIG. 2 is a side sectional view taken on the line 2—2 of FIG. 1.

Referring to the drawings, FIGS. 1–6, an irradiator 10 may have a steel housing 11 surrounded by concrete shielding material 12 to form the housing for the irradiator 10. A fluid inlet 13 allows a liquid to be fed into an inner arcuate chamber 14 where the liquid passes around the outer shell 11 going over baffles 15 and under baffles 16 placed around the chamber 14 until the chamber ends in the wall 17 where the fluid passes through a passageway 18 into an inner arcuate chamber 20. As shown by the arrows, the fluid passes around the chamber 20 over baffles 21 and under baffles 22 as it passes therearound to a fluid outlet opening 23 which then passes under the irradiator and out the fluid discharge opening 24. The fluid passing around the inner chamber 20 abuts against an end wall 25 which forces it out the exit opening 23 and prevents it from recirculating. The irradiator 10 has a cylindrical inner wall 26 leaving a void area 27 in the middle thereof for use to place a test material or the like to be irradiated from the radiation sources 28 placed in the radiation. A series of radiation sources, which are contemplated to be cesium-137 or cobalt-60, are formed in pencil shaped containers and placed within containers to provide a coaxially or annular passageway 30 around each radiation source 28. Three of the radiation sources 28 are placed within the circular dividing wall 31 and thereby provide radiation in both the passageways or annular chambers 14 and 20 simultaneously. The passageways 30 are formed by an outer wall 32 having the radiation source 28 centered therein and thus provides for the passage of air and gas through the passageway 30 around the radiation and just adjacent the radiation source 28. An additional three radiation source chambers 33 having sources 28 therein are placed around the fluid passageway 20 adjacent the inner wall 26 to provide radiation for the inner chamber 20 as fluids pass thereby and also provides radiation into the open center area 27 for radiation materials placed within the area 27. The open center area 27 is constructed such that it can be filled with water or some other fluid that will serve to protect operators placing objects or materials within the center area 27 from the gamma rays from the radiation source 28 and the smaller cobalt-60 sources 42. A pair of radiation supporting chambers 34 are placed adjacent the opening 18 and have the radiation sources 28 centered therein for providing an annular passageway therearound past the radiation sources 28 to provide radiation to the fluid passing thereby through the opening 18 between the chambers. Radiation chambers 34 may be either similar to radiation chamber 30 or 42. This pair of radiation sources also provides radiation into both chambers as well as through the passageway 35 from the exit opening 23 to the exit 24.

Thus, a fluid or liquid to be treated can enter the irradiator 13, pass through the chambers 14, over the baffles 15, and under the baffles 16 while being irradiated as it passes around the chamber 14 until it enters the chamber 20 where it is radiated from both sides as it passes therearound and out the end exit opening 23.

The annular passageway 30 around the radiation sources 28 in the chambers 32 as well as through the chambers 33, 34 and chambers 42 all provide a passageway for a gas, such as air or oxygen, which is receiving a maximum dose of radiation as it passes through the annular chambers from the top of the irradiator to the bottom, as illustrated in FIG. 2, which advantageously converts the oxygen passing therethrough to ozone which is then fed into bottom plenums 37 having a plurality of openings therein spaced around the inner chamber 14 and 20 to distribute the ozone which is being pumped therethrough under pressure into the liquid in a uniform manner as the liquid is passing through the irradiator. Thus, the irradiated liquid has ozone being constantly fed therein which is being produced within the radiator which is thereby acting as an ozonator using the same radiation sources as used to irradiate the liquid. This allows the irradiator to get the combined treatment which has been shown to provide a synergistic effect on certain chemicals being fed through the irradiator. The system is particularly advantageous for feeding contaminated liquids, such as sewage and industrial waste, to both kill the microorganisms within the liquid while simultaneously changing some of the toxic elements in the waste to form less toxic components. The flow of the air and ozone past the radiation sources 28 is shown by a series of arrows in FIGS. 2, 4 and 5. The air is being pumped by pump 38, as illustrated in FIG. 5, to thereby place the air or other gas under pressure so that it can be forced into the liquid from the bottom of the irradiator. The irradiator also has a plurality of gas vent valves 40 spaced therearound for venting the gases bubbling through the liquid out of the irradiator. In addition, there are drainage ports 41 placed in the bottom of the irradiator for removing samples or accumulated solid materials from the irradiator. Also, the irradiator has a plurality of smaller containers 42 placed around the inner wall 26 and outer wall 31, in five or more pairs, each for holding cobalt-60, surrounded by an annular passageway similar to the containers 30, 33, and 34 except on a smaller scale which also provides for the passage of gas therethrough around the cobalt-60 radiation sources 43 and are also shaped in pencil-like rods. Since the irradiator has both cobalt-60 and cesium137, the holders, each of which has an annular passageway therearound, for the passage of air or oxygen to create ozone when pumped around and adjacent the radiation sources which ozone is pumped immediately into the liquid passing through the irradiator. The irradiator simultaneously provides an inner chamber for testing materials or irradiating bulk materials which has easy access for placing and removing materials in the center of the irradiator. The gas being pumped by the pump 38 is passed through upper manifolds 44. The irradiator, as illustrated in FIGS. 1–6, also has a radiation blocking cover which might typically be a concrete cover but could also be a combination of lead and steel or any other material which would block the escape of the radiation from the irradiation sources in the irradiator and would, of course, have to be raised or removed for entering the irradiator for loading or charging with a radiation. The cover might also have a central opening for the chamber 27 for the insertion or removal of test materials or other bulk materials to be irradiated.

It should be clear at this time that an irradiator has been provided which advantageously acts as an ozonator for creating ozone by irradiating oxygen or air or which could also be used to irradiate other gases being fed to the liquid passing through the irradiator which radiation sources are simultaneously irradiating the fluid passing therethrough and which are also positioned for irradiating solid or other bulk substances located in the center of the irradiator. However, the present invention is not to be construed as limited to the forms shown which are to be considered illustrative rather than restrictive.

We claim:

1. An irradiator apparatus comprising:

a casing having a fluid input thereinto and a fluid output therefrom, said casing also having a gas input thereinto;

a fluid passageway in said casing connecting said fluid input to said fluid output;

a gas passageway in said casing connecting said gas input into said fluid passageway for directing gas into said fluid passing through said fluid passageway;

a plurality of gamma radiation source supports located in said casing and supporting a plurality of gamma radiation sources therein and each said gamma radiation source being positioned adjacent to said fluid and gas passageways for simultaneously irradiating a gas passing through said gas passageway and a fluid passing through said fluid passageway, whereby an irradiated gas is fed into a fluid being irradiated; and said irradiator casing having a hollow center portion having said fluid passageway passing therearound for irradiation of materials placed therein.

2. An irradiator apparatus in accordance with claim 1 in which said gas passageway includes a concentric passageway portion surrounding one radiation source to thereby irradiate a gas passing therethrough adjacent said radiation source.

3. An irradiator apparatus in accordance with claim 2 in which said plurality of gamma radiation sources are each surrounded by a concentric gas passageway and each said concentric gas passageway is located in said fluid passageway whereby said gas and fluid in said irradiator are irradiated by the same radiation sources.

4. An irradiator apparatus in accordance with claim 3 in which said gas input line is connected to a gas pump located outside said irradiator casing.

5. An irradiator apparatus in accordance with claim 4 in which said irradiator fluid passageway includes a plurality of baffles placed therein to thereby form a serpentine passageway to increase the irradiation of fluid passing therethrough.

6. An irradiator apparatus in accordance with claim 5 including a plurality of gas outlets from said irradiator casing to thereby allow gas passing through said fluid to escape from said irradiator.

7. An irradiator apparatus in accordance with claim 6 in which fluid passageway is circular and passes around said center core twice.

8. An irradiator apparatus comprising:

an irradiator housing;

an ozone generator located in said irradiator housing and having a gas passageway, a gamma radiation source positioned adjacent said gas passageway, said ozone generator having a gas input into said irradiator housing and into said gas passageway;

a fluid passageway located inside said irradiator housing and adjacent said ozone generator gamma radiation source for irradiating fluid passing therethrough, said fluid passageway having a fluid input opening and a fluid output opening through said irradiator housing;

a gas feed connecting said ozone generator to said fluid passageway for feeding ozone created therein into said fluid being irradiated whereby an irradiator generates ozone and feeds the ozone into a fluid being irradiated; and said irradiator housing having a hollow center portion having said fluid passageway passing therearound for irradiation of materials placed therein.

9. An irradiator apparatus in accordance with claim 8 in which said gas passageway is an annular passageway surrounding one radiation source.

10. An irradiator apparatus in accordance with claim 9 in which said ozone generator has a plurality of gas passageways each surrounding one of a plurality of radiation sources.

11. An irradiator apparatus in accordance with claim 10 in which said plurality of gamma radiation sources are each surrounded by a concentric gas passageway and each said concentric gas passageway is located in said fluid passageway whereby gas and fluid in said irradiator are irradiated by the same radiation sources.

12. An irradiator apparatus in accordance with claim 11 in which said ozone generator includes a gas pump located outside said irradiator housing.

13. An irradiator apparatus in accordance with claim 12 in which said fluid passageway includes a plurality of baffles placed therein to form a serpentine passageway to increase the irradiation of fluid passing therethrough.

14. An irradiator apparatus in accordance with claim 13 including a plurality of gas outlets from said irradiator housing to thereby allow gas passing through said fluid to escape from said irradiator housing.

15. An irradiator apparatus in accordance with claim 14 in which said fluid passageway is circular and passes twice around said hollow center portion.

\* \* \* \* \*